United States Patent
Neuneker et al.

(10) Patent No.: US 10,713,551 B2
(45) Date of Patent: Jul. 14, 2020

(54) RFID CIRCUITS DISABLED IN RESPONSE TO A PREDETERMINED NUMBER OF READINGS

(71) Applicant: HEWLETT-PACKARD DEVELOPMENT COMPANY, L.P., Spring, TX (US)

(72) Inventors: Jonathan Neuneker, Boise, ID (US); Shaun Henry, Boise, ID (US); Greg Creager, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/475,824

(22) PCT Filed: Jan. 4, 2017

(86) PCT No.: PCT/US2017/012147
§ 371 (c)(1),
(2) Date: Jul. 3, 2019

(87) PCT Pub. No.: WO2018/128603
PCT Pub. Date: Jul. 12, 2018

(65) Prior Publication Data
US 2019/0354828 A1    Nov. 21, 2019

(51) Int. Cl.
*G06K 19/073* (2006.01)
*G06K 7/10* (2006.01)

(52) U.S. Cl.
CPC ... *G06K 19/07345* (2013.01); *G06K 7/10316* (2013.01)

(58) Field of Classification Search
None
See application file for complete search history.

(56) References Cited

U.S. PATENT DOCUMENTS

| | | | |
|---|---|---|---|
| 6,362,738 B1 * | 3/2002 | Vega | G06K 7/0008 340/10.1 |
| 7,411,503 B2 | 8/2008 | Stewart et al. | |
| 7,636,032 B2 | 12/2009 | Kantrowitz et al. | |
| 8,581,730 B2 | 11/2013 | Forster et al. | |
| 9,105,024 B2 | 8/2015 | Gentelei et al. | |
| 2007/0285250 A1 | 12/2007 | Moskowitz et al. | |
| 2008/0157974 A1 | 7/2008 | Boss et al. | |
| 2009/0134977 A1 * | 5/2009 | Grewe | G06K 7/0008 340/10.3 |
| 2011/0254665 A1 | 10/2011 | Lindsay et al. | |
| 2013/0207786 A1 | 8/2013 | Hutzler et al. | |
| 2015/0186689 A1 | 7/2015 | Hess et al. | |

(Continued)

OTHER PUBLICATIONS

AKS Innovations, "Self-destructive RFID tags for Precision Agriculture and control of seeds circulation", 2010 http://power-idea.com/ideas/business-ideas/self-destructive-rfid-tags.html.

(Continued)

*Primary Examiner* — Kristy A Haupt
(74) *Attorney, Agent, or Firm* — HP Inc. Patent Department

(57) ABSTRACT

One example of a device includes a radio-frequency identification (RFID) circuit and a security circuit. The security circuit disables the RFID circuit directly in response to a predetermined number of readings of the RFID circuit.

18 Claims, 4 Drawing Sheets

(56) References Cited

U.S. PATENT DOCUMENTS

2015/0317899 A1 11/2015 Dumbauld et al.

OTHER PUBLICATIONS

Hobbus R., "DOJ: China Planted RFID Chips in 11 Million Happy Meal Toys Bound for U.S.", Jul. 9, 2016 http://realnewsrightnow.com/2016/07/doj-china-planted-rfid-chips-11-million-happy-meal-toys-bound-u-s/.
How to Block or Kill Rfid Chips, Aug. 28, 2010, http://nexusilluminati.blogspot.in/2010/08/how-to-block-or-kill-rfid-chips.html.
Synotag RFID Wristbands and RFID Bracelets, Synometrix, 2016 http://www.synometrix.com/synotag-2/passive-rfid-products/rfid-wristbands-bracelets/.
Yoshida, Junko, "RFID backlash prompts 'kill' feature", Apr. 28, 2003, http://www.eetimes.com/document.asp?doc_id=1226323.
Zhao, Andy, "Self-destructive NFC Tag 13.56MHz 14443A Fragile label Easy Shredding", Published Jun. 21, 2013 https://www.youtube.com/watch?v=eZP7jriAl28.

* cited by examiner

RFID CIRCUITS DISABLED IN RESPONSE TO A PREDETERMINED NUMBER OF READINGS

BACKGROUND

Radio-frequency identification (RFID) uses radio frequency waves to identify specially tagged items. An RFID system includes two basic components, the RFID tag and the tag reader and/or writer. RFID readers generate an electromagnetic field that interacts with RFID tags to read data stored within RFID tags. RFID writers generate an electromagnetic field that interacts with RFID tags to write data to RFID tags. The RFID tags contain an antenna and microchips encoded with data. RFID tags may be passive, semi-active, or fully active devices. A passive tag can be read up to 10 feet from the reader. The tag then transmits its information via radio waves to the reader, which receives the unique data from the tag. Semi-passive tags, which have a longer range than passive tags, use a battery to power their own circuitry but still draw on a reader field to power their broadcasting. Active tags use battery power to overcome limitations of more passive tags and have a much longer read and write range.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Radio-frequency identification (RFID) cards are becoming increasingly popular. For certain applications, single use or limited use RFID cards would be advantageous, such as for access cards (e.g., security cards, temporary passes), tickets (e.g., travel tickets, event tickets, carnival ride tickets), gift cards, and the like. Accordingly, disclosed herein are RFID devices including a security circuit or self-destruct circuit to disable the RFID device directly in response to one reading of the RFID device or in response to a predetermined number of readings of the RFID device. The RFID device may be permanently disabled, for example via a fuse or circuit destruction, or temporarily disabled, for example via an auto-reset fuse, a programmable bit, or a capacitor circuit. In one example, a voltage multiplier circuit may be used to permanently or temporarily disable the RFID device.

Figure 1:
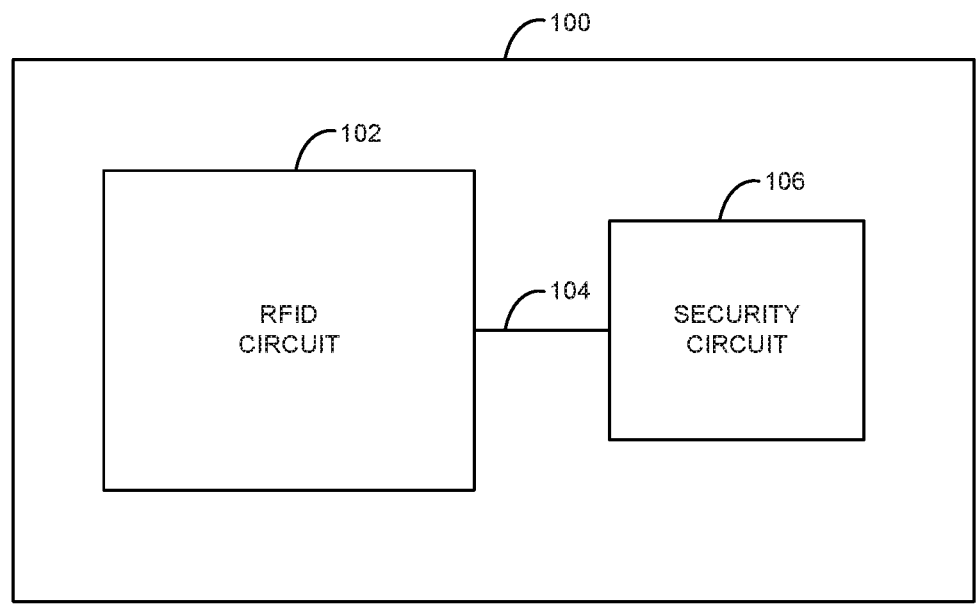
FIG. 1 is a block diagram illustrating one example of a radio-frequency identification (RFID) device including a security circuit.

FIG. 1 is a block diagram illustrating one example of an RFID device 100. RFID device 100 includes an RFID circuit 102 and a security circuit 106. RFID circuit 102 is electrically coupled to security circuit 106 through a signal path 104. RFID device 100 may be an access card (e.g., a security card, temporary pass), a ticket (e.g., a travel ticket, an event ticket, a carnival ride ticket), a gift card, or another suitable RFID device. In addition to RFID circuit 102 and security circuit 106, depending upon the application, RFID device 100 may also include an electronic visual display, text and/or images, optical codes, and/or other suitable components (not shown).

RFID circuit 102, as will be described in more detail below with reference to FIG. 3, includes an antenna and circuitry to wirelessly interact with an RFID reader and/or writer. RFID circuit 102 stores data identifying RFID device 100 that may be wirelessly transmitted to an RFID reader in response to a request from the RFID reader. In one example, the data stored within RFID circuit 102 may be written by an RFID writer.

Security circuit 106 disables RFID circuit 102 in response to a predetermined number of readings of RFID circuit 102. In one example, security circuit 106 permanently disables RFID circuit 102 in response to the predetermined number of readings of the RFID circuit. In another example, security circuit 106 temporarily disables RFID circuit 102 for a predetermined period in response to the predetermined number of readings of RFID circuit 102. In one example, the predetermined number equals one such that RFID device 100 is a single use device. In other examples, the predetermined number is greater than one such that RFID device 100 is a limited use device.

In one example, with RFID circuit 102 temporarily disabled by security circuit 106, RFID circuit 102 may be re-enabled automatically after a predetermined period by security circuit 106. The predetermined period may include any suitable period, such as a few seconds to several hours or days depending upon the application. In another example, with RFID circuit 102 temporarily disabled by security circuit 106, RFID circuit 102 may be re-enabled by an RFID writer resetting the RFID circuit.

Figure 2:
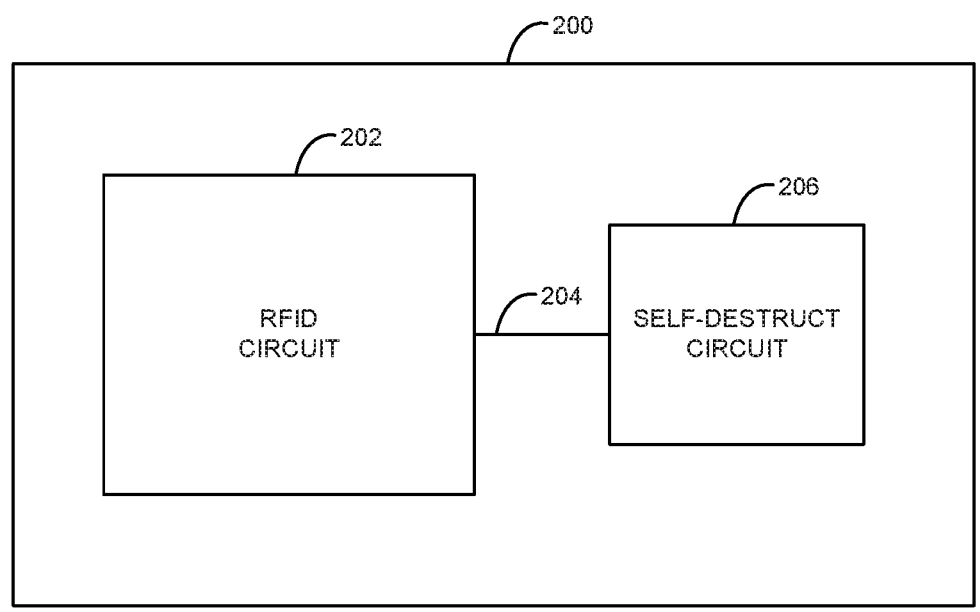
FIG. 2 is a block diagram illustrating one example of an RFID device including a self-destruct circuit.

FIG. 2 is a block diagram illustrating another example of an RFID device 200. RFID device 200 includes an RFID circuit 202 and a self-destruct circuit 206. RFID circuit 202 is electrically coupled to self-destruct circuit 206 through a signal path 204. RFID device 200 may be an access card (e.g., a security card, temporary pass), a ticket (e.g., a travel ticket, an event ticket, a carnival ride ticket), a gift card, or another suitable RFID device. In addition to RFID circuit 202 and self-destruct circuit 206, depending upon the application, RFID device 200 may also include an electronic visual display, text and/or images, optical codes, and/or other suitable components (not shown). In one example, RFID circuit 202 is similar to RFID circuit 102 previously described and illustrated with reference to FIG. 1.

Self-destruct circuit 206 permanently disables RFID circuit 202 in response to a predetermined number of readings of RFID circuit 202. In one example, the predetermined number equals one such that RFID device 200 is a single use device. In other examples, the predetermined number is greater than one such that RFID device 200 is a limited use device. In one example, self-destruct circuit 206 may permanently disable RFID circuit 202 by destroying a portion of RFID circuit 202 such that RFID circuit 202 is rendered inoperable. In one example, a single use fuse within RFID circuit 202 may be opened by self-destruct circuit 206 to render RFID circuit 202 inoperable. In another example, self-destruct circuit 206 may apply an electrical signal to RFID circuit 202 that overloads at least a portion of RFID circuit 202 such that signal traces and/or electrical components (e.g., transistors, capacitors, resistors, etc.) are destroyed to create open and/or short circuits that render RFID circuit 202 inoperable.

Figure 3:
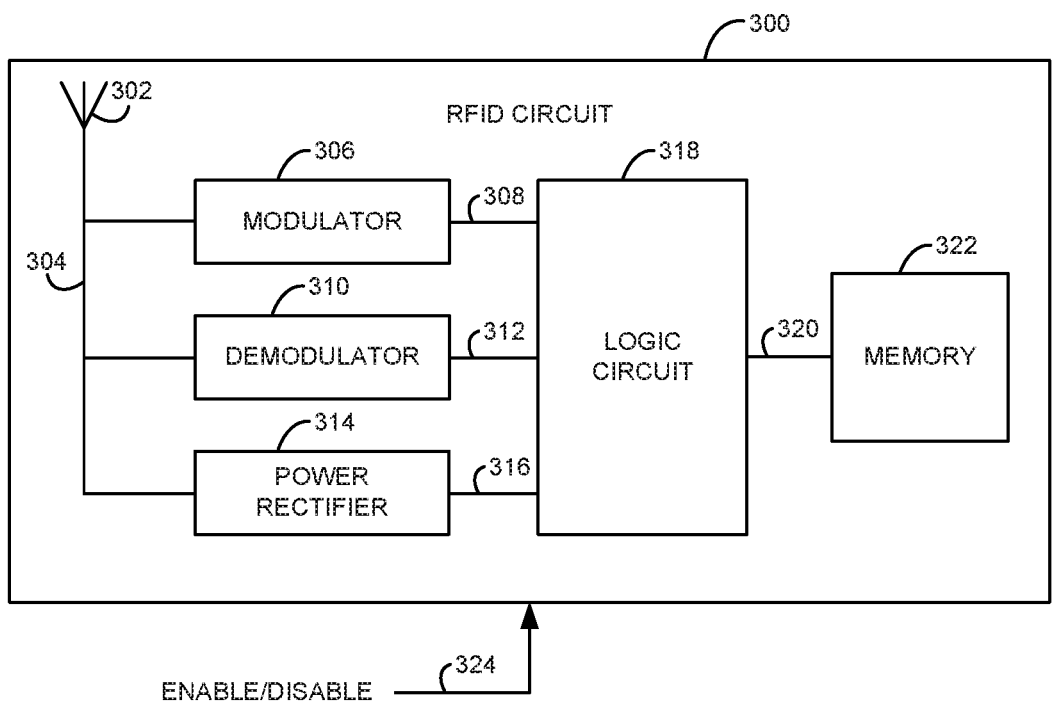
FIG. 3 is a block diagram illustrating one example of an RFID circuit that may be disabled.

FIG. 3 is a block diagram illustrating one example of an RFID circuit 300 that may be disabled. In one example, RFID circuit 300 provides RFID circuit 102 previously described and illustrated with reference to FIG. 1 or RFID circuit 202 previously described and illustrated with reference to FIG. 2. RFID circuit 300 includes an antenna 302, a modulator 306, a demodulator 310, a power rectifier 314, a logic circuit 318, and a memory 322.

Antenna 302 is electrically coupled to modulator 306, demodulator 310, and power rectifier 314 through a signal path 304. Modulator 306 is electrically coupled to logic circuit 318 through a signal path 308. Demodulator 310 is electrically coupled to logic circuit 318 through a signal path 312. Power rectifier 314 is electrically coupled to logic circuit 318 through a signal path 316. Logic circuit 318 is electrically coupled to memory 322 through a signal path 320. In one example, modulator 306, demodulator 310, power rectifier 314, logic circuit 318, and memory 322 are integrated into a semiconductor chip.

Logic circuit 318 controls the operation of RFID circuit 300 including responding to read requests and/or write requests from an RFID reader and/or writer. Memory 322 stores data identifying RFID circuit 300, which may be read and/or written by logic circuit 318 in response to a read and/or write request. Modulator 306 encodes data passed to modulator 306 from logic circuit 318 and transmits the encoded data to an RFID reader in response to a read request from the RFID reader. Demodulator 310 receives and decodes requests and/or data transmitted from an RFID reader and/or writer and passes the decoded requests and/or data to logic circuit 318 for processing. Power rectifier 314 receives radio signals from antenna 302 to generate power for operating RFID circuit 300 including logic circuit 318. While RFID circuit 300 is passive in this example, in other examples, RFID circuit 300 may include a battery in place of or in addition to power rectifier 314 to provide a semi-active or fully active RFID circuit.

RFID circuit 300 receives an enable/disable signal through a signal path 324. In one example, the enable/disable signal is received from security circuit 106 previously described and illustrated with reference to FIG. 1 or from self-destruct circuit 206 previously described and illustrated with reference to FIG. 2. In response to a first signal value (e.g., logic low, low or no voltage) of the enable/disable signal, RFID circuit 300 is enabled for read operations. In response to a second signal value (e.g., logic high, high voltage) of the enable/disable signal, RFID circuit 300 is disabled for read operations. RFID circuit 300 may be disabled by disabling antenna 302, modulator 306, demodulator 310, power rectifier 314, logic circuit 318, and/or memory 322. Any suitable method may be used to disable RFID circuit 300 based on the disable signal.

Figure 4:
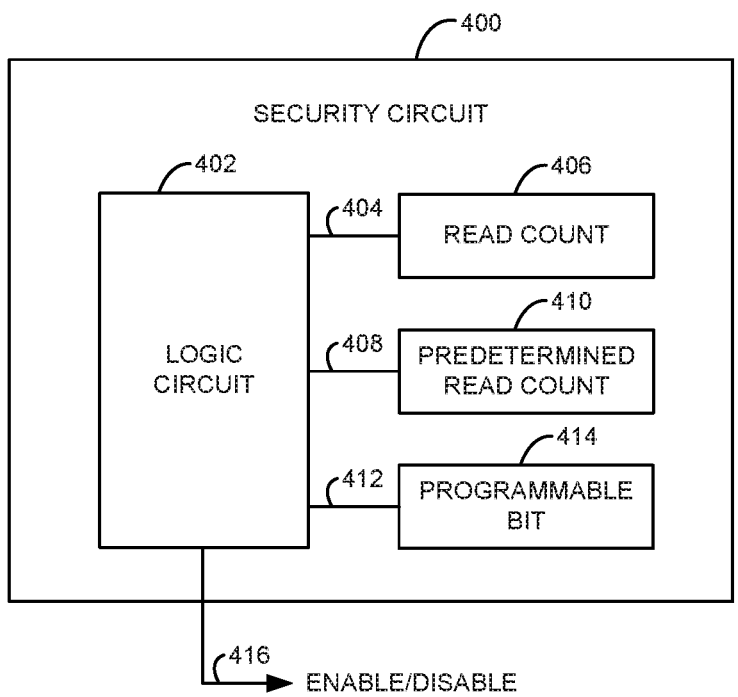
FIG. 4 is a block diagram illustrating one example of a security circuit of an RFID device.

FIG. 4 is a block diagram illustrating one example of a security circuit 400 of an RFID device. In one example, security circuit 400 provides security circuit 106 previously described and illustrated with reference to FIG. 1. Security circuit 400 includes a logic circuit 402, a read count 406, a predetermined read count 410, and a programmable bit 414. Logic circuit 402 is electrically coupled to read count 406 through a signal path 404, to predetermined read count 410 through a signal path 408, and to programmable bit 414 through a signal path 412. Logic circuit 402 provides an enable/disable signal on a signal path 416. In one example, the enable/disable signal on signal path 416 is applied to the enable/disable signal path 324 of RFID circuit 300 previously described and illustrated with reference to FIG. 3.

Logic circuit 402 controls the operation of security circuit 400 and provides the enable/disable signal to enable and/or disable an RFID circuit in response to a predetermined number of readings of the RFID circuit. Read count 406, predetermined read count 410, and programmable bit 414 may be stored at memory locations, in registers, or in other suitable storage devices. In one example, logic circuit 402 may be integrated within logic circuit 318 and read count 406, predetermined read count 410, and programmable bit 414 may be stored within memory 322 of RFID circuit 300 previously described and illustrated with reference to FIG. 3. In this example, the logic of security circuit 400 may be embedded directly into the boot sequence of the RFID circuit such that the security logic executes prior to the RFID circuit logic. In other examples, security circuit 400 may be a discrete circuit separate from the RFID circuit.

Read count 406 stores the number of times the RFID circuit has been read. Read count 406 is initially set to zero and is incremented by one each time the RFID circuit is read. Any suitable method may be used to detect that the RFID circuit has been read, such as power from the power rectifier (e.g., power rectifier 314 of FIG. 3) exceeding a threshold value, the modulator (e.g., modulator 306 of FIG. 3) transmitting a signal, and the like. Predetermined read count 410 stores the predetermined number of readings of the RFID circuit before the RFID circuit is to be disabled. In one example, the predetermined number is equal to one. In other examples, the predetermined number is greater than one. Programmable bit 414 indicates whether the RFID circuit is currently enabled or disabled. Programmable bit 414 has a first value (e.g., logic low) when the read count is less than the predetermined read count to indicate the RFID circuit is enabled. In response to programmable bit 414 indicating the RFID circuit is enabled, logic circuit 402 provides an enable signal on enable/disable signal path 416.

Logic circuit 402 sets programmable bit 414 to a second value (e.g., logic high) when the read count equals the predetermined read count to disable the RFID circuit. In one example, at the end of each read cycle after read count 406 has been incremented, read count 406 is compared to predetermined read count 410 and programmable bit 414 is set based on the comparison. In another example, each time the RFID circuit transitions from a power-down state to an operational state, read count 406 is compared to predetermined read count 410 and programmable bit 414 is set based on the comparison.

In response to programmable bit 414 indicating the RFID circuit is disabled, logic circuit 402 provides a disable signal on enable/disable signal path 416. In one example, in response to programmable bit 414 being set during a read cycle to indicate the RFID circuit should be disabled, the currently active read cycle is interrupted and not completed. In another example, in response to programmable bit 414 being set during a read cycle to indicate the RFID circuit should be disabled, the currently active read cycle is allowed to finish but subsequent read cycles are prevented. The disable signal may disable the RFID circuit by blocking power to the RFID circuit or by using another suitable method.

Once programmable bit 414 is set to indicate the RFID circuit is disabled, programmable bit 414 may be reset to the first value (e.g., logic low) by an RFID writer to re-enable the RFID circuit. Accordingly, the RFID circuit is disabled directly in response to a predetermined number of readings of the RFID circuit and may be re-enabled by an RFID writer. Read count 406 and/or predetermined read count 410 may also be reset by an RFID writer when programmable bit 414 is reset or logic circuit 402 may reset read count 406 in response to an RFID writer resetting programmable bit 414. In another example, programmable bit 414 may be omitted, and logic circuit 402 may determine whether to set the enable/disable signal based on comparing read count 406 to predetermined read count 410. In a single use example, read count 406 and predetermined read count 410 may be omitted, and logic circuit 402 may set programmable bit 414 to the second value in response to the RFID circuit being read.

Figure 5:
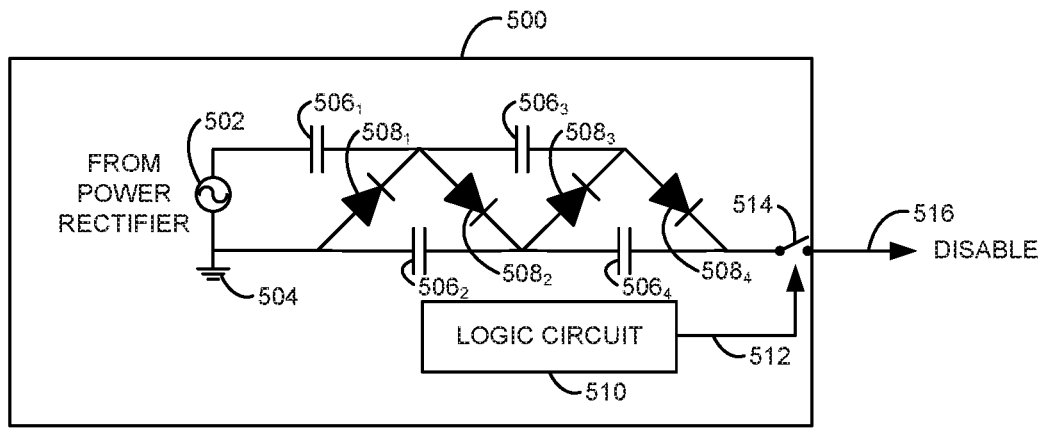
FIG. 5 illustrates one example of a security circuit including a voltage multiplier circuit.

FIG. 5 illustrates one example of a security circuit 500 including a voltage multiplier circuit. In one example, security circuit 500 provides security circuit 106 previously described and illustrated with reference to FIG. 1 or self-destruct circuit 206 previously described and illustrated with reference to FIG. 2. Security circuit 500 includes a voltage source 502 from a power rectifier, such as power rectifier 314 of RFID circuit 300 previously described and illustrated with reference to FIG. 3. Security circuit 500 also includes a plurality of capacitors $506_1$ to $506_4$, a plurality of diodes $508_1$ to $508_4$, a logic circuit 510, and a switch 514.

Capacitors $506_1$ to $506_4$ and diodes $508_1$ to $508_4$ are arranged to provide a voltage multiplier circuit. The positive terminal of voltage source 502 is electrically coupled to capacitor $506_1$ of the voltage multiplier circuit. The negative terminal of voltage source 502 is electrically coupled to a common or ground 504 and to diode $508_1$ and capacitor $506_2$ of the voltage multiplier circuit. Diode $508_4$ and capacitor $506_4$ of the voltage multiplier circuit are electrically coupled to one side of switch 514. The other side of switch 514 is electrically coupled to a disable signal path 516. Logic circuit 510 is electrically coupled to the control input of switch 514 through a signal path 512.

The voltage multiplier circuit converts the lower voltage alternating current (AC) electrical power from voltage source 502 to a higher direct current (DC) voltage. While four capacitors $506_1$ to $506_4$ and four diodes $508_1$ to $508_4$ are included in the illustrated voltage multiplier circuit, in other examples, any suitable number of capacitors and diodes may be used to provide a suitable DC voltage. The DC voltage is built up by charging capacitors $506_1$ to $506_4$ prior to the reading of the RFID circuit. The voltage stored within capacitors $506_1$ to $506_4$ is sufficient to temporarily disable (e.g., by opening an auto-reset fuse) or permanently destroy (e.g., by opening a one-time fuse or by overloading a circuit such that the circuit is destroyed) the RFID circuit when the stored DC voltage is discharged via switch 514 onto disable signal path 516. In one example, the disable signal on disable signal path 516 is applied to enable/disable signal path 324 of RFID circuit 300 previously described and illustrated with reference to FIG. 3.

Logic circuit 510 controls switch 514 to close in response to a predetermined number of readings of the RFID circuit. Switch 514 is closed once the read cycle that triggered the closing of switch 514 is complete. In one example, logic circuit 510 closes switch 514 in response to one reading of the RFID circuit. In this example, logic circuit 510 may include a resistor/capacitor (RC) circuit to delay the closing of switch 514 until the reading of the RFID circuit is complete. In another example, logic circuit 510 closes switch 514 in response to a number of readings of the RFID circuit greater than one. Logic circuit 510 may be a discrete circuit or integrated within a logic circuit of an RFID circuit, such as logic circuit 318 of RFID circuit 300 previously described and illustrated with reference to FIG. 3.

Figure 6:
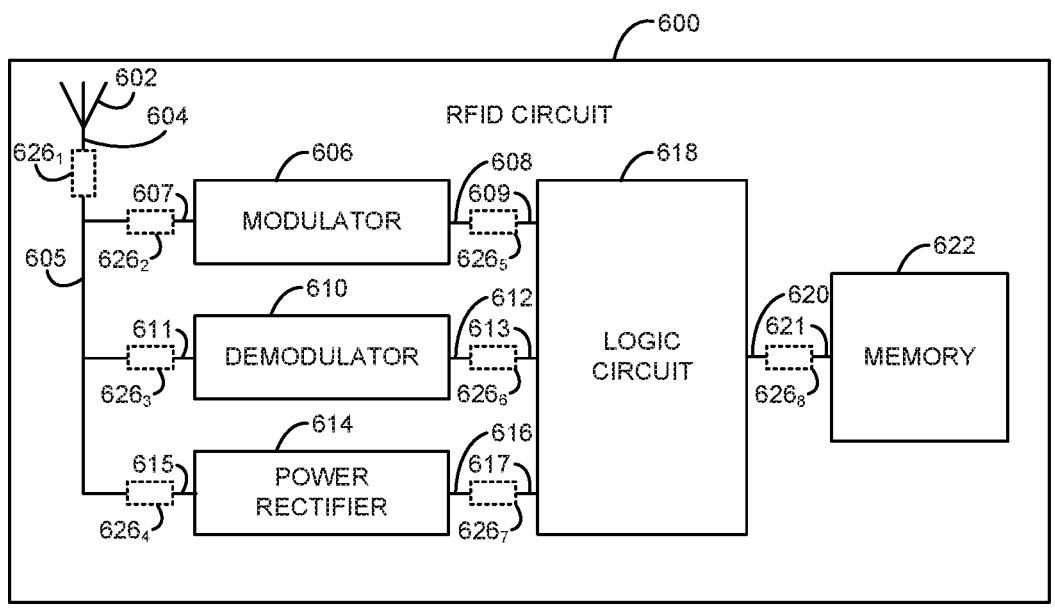
FIG. 6 is a block diagram illustrating one example of an RFID circuit including a plurality of fuse locations that may be used to disable the RFID circuit.

FIG. 6 is a block diagram illustrating one example of an RFID circuit 600 including a plurality of fuse locations $626_1$ to $626_8$ (indicated by dashed lines) that may be used to disable the RFID circuit. While a fuse at any one of fuse locations $626_1$ to $626_8$ is sufficient for disabling RFID circuit 600, RFID circuit 600 may include a fuse at more than one fuse location $626_1$ to $626_8$. Accordingly, the particular fuse location(s) may be selected based on manufacturability, security, or other suitable considerations. In one example, RFID circuit 600 provides RFID circuit 102 previously described and illustrated with reference to FIG. 1 or RFID circuit 202 previously described and illustrated with reference to FIG. 2.

RFID circuit 600 includes an antenna 602, a modulator 606, a demodulator 610, a power rectifier 614, a logic circuit 618, and a memory 622. Antenna 602 is electrically coupled to one side of fuse location $626_1$ through a signal path 604. The other side of fuse location $626_1$ is electrically coupled to one side of each fuse location $626_2$ to $626_4$ through a signal path 605. The other side of fuse location $626_2$ is electrically coupled to modulator 606 through a signal path 607. The other side of fuse location $626_3$ is electrically coupled to demodulator 610 through a signal path 611. The other side of fuse location $626_4$ is electrically coupled to power rectifier 614 through a signal path 615.

Modulator 606 is electrically coupled to one side of fuse location $626_5$ through a signal path 608. The other side of fuse location $626_5$ is electrically coupled to logic circuit 618 through a signal path 609. Demodulator 610 is electrically coupled to one side of fuse location $626_6$ through a signal path 612. The other side of fuse location $626_6$ is electrically coupled to logic circuit 618 through a signal path 613. Power rectifier 614 is electrically coupled to one side of fuse location $626_7$ through a signal path 616. The other side of fuse location $626_7$ is electrically coupled to logic circuit 618 through a signal path 617. Logic circuit 618 is electrically coupled to one side of fuse location $626_8$ through a signal path 620. The other side of fuse location $626_8$ is electrically coupled to memory 622 through a signal path 621.

A fuse at fuse location $626_1$ may be used to disable antenna 602. If fuse location $626_1$ is not used, signal path 604 is directly electrically coupled to signal path 605. A fuse at fuse location $626_2$ and/or $626_5$ may be used to disable modulator 606. If fuse location $626_2$ and/or $626_5$ is not used, signal path 605 is directly electrically coupled to signal path 607 and/or signal path 608 is directly electrically coupled to signal path 609. A fuse at fuse location $626_3$ and/or $626_6$ may be used to disable demodulator 610. If fuse location $626_3$ and/or $626_6$ is not used, signal path 605 is directly electrically coupled to signal path 611 and/or signal path 612 is directly electrically coupled to signal path 613. A fuse at fuse location $626_4$ and/or $626_7$ may be used to disable power rectifier 614. If fuse location $626_4$ and/or $626_7$ is not used, signal path 605 is directly electrically coupled to signal path 615 and/or signal path 616 is directly electrically coupled to signal path 617. A fuse at fuse location $626_8$ may be used to disable logic circuit 618 and/or memory 622. If fuse location 626₈ is not used, signal path 620 is directly electrically coupled to signal path 621.

A fuse at a selected fuse location 626₁ to 626₈ remains closed until a disable signal is applied across the fuse. A disable signal, such as a disable signal on disable signal path 516 of security circuit 500 previously described and illustrated with reference to FIG. 5, may be applied to one side of the fuse while the other side of the fuse is grounded (e.g., via a switch (not shown)) to overload and thereby open the fuse to disable RFID circuit 600. The fuse may be a single use fuse to permanently disable RFID circuit 600 once the fuse is opened or may be an auto-reset fuse that automatically resets after a predetermined period to re-enable RFID circuit 600. In one example, the disable signal is applied at the end of a read cycle, which prevents the operation of RFID circuit 600 for subsequent read cycles.

Figure 7:
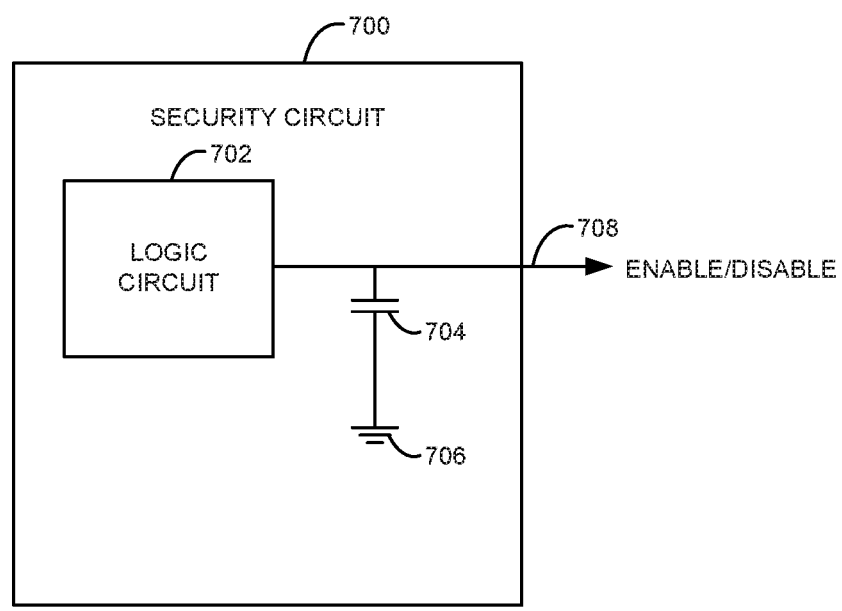
FIG. 7 illustrates one example of a security circuit including a capacitor used to enable and disable an RFID circuit.

FIG. 7 illustrates one example of a security circuit 700 including a capacitor used to enable and disable an RFID circuit. In one example, security circuit 700 provides security circuit 106 previously described and illustrated with reference to FIG. 1. Security circuit 700 includes a logic circuit 702 and a capacitor 704. Logic circuit 702 is electrically coupled to one side of capacitor 704 through an enable/disable signal path 708. The other side of capacitor 704 is electrically coupled to a common or ground 706. Logic circuit 702 may be a discrete circuit or integrated within a logic circuit of an RFID circuit, such as logic circuit 318 of RFID circuit 300 previously described and illustrated with reference to FIG. 3.

When capacitor 704 is charged, the RFID circuit is disabled. When capacitor 704 is discharged, the RFID circuit is enabled. In response to a predetermined number of readings of the RFID circuit, logic circuit 702 charges capacitor 704 to provide a disable signal on enable/disable signal path 708. Once capacitor 704 is discharged after a predetermined period based on logic circuit 702 and the size of capacitor 704, an enable signal is provided on enable/disable signal path 708. In one example, the signal on enable/disable signal path 708 is applied to enable/disable signal path 324 of RFID circuit 300 previously described and illustrated with reference to FIG. 3.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device comprising:
a radio-frequency identification (RFID) circuit; and
a security circuit to disable the RFID circuit directly in response to a predetermined number of readings of the RFID circuit, wherein the security circuit comprises a voltage multiplier circuit charged via radio signals to disable the RFID circuit in response to the discharge of the voltage stored in the voltage multiplier circuit to the RFID circuit.

2. The device of claim 1, wherein the security circuit permanently disables the RFID circuit in response to the predetermined number of readings of the RFID circuit.

3. The device of claim 1, wherein the security circuit temporarily disables the RFID circuit fora predetermined period in response to the predetermined number of readings of the RFID circuit.

4. The device of claim 1, wherein the security circuit comprises a programmable bit to disable the RFID circuit in response to the predetermined number of readings of the RFID circuit, and
wherein the programmable bit is resettable by an RFID writer.

5. The device of claim 1, wherein the predetermined number equals one.

6. A device comprising:
a radio-frequency identification (RFID) circuit; and
a self-destruct circuit to permanently disable the RFID circuit directly in response to a predetermined number of readings of the RFID circuit, wherein the self-destruct circuit comprises a voltage multiplier circuit charged via radio signals to permanently disable the RFID circuit in response to the discharge of the voltage stored in the voltage multiplier circuit to the RFID circuit.

7. The device of claim 6, wherein the self-destruct circuit comprises a fuse that is opened in response to the predetermined number of readings of the RFID circuit.

8. The device of claim 6, wherein the predetermined number equals one.

9. A device comprising:
a radio-frequency identification (RFID) circuit; and
a security circuit to temporarily disable the RFID circuit directly in response to a predetermined number of readings of the RFID circuit,
wherein the security circuit comprises an auto-reset fuse that is opened in response to the predetermined number of readings of the RFID circuit to disable the RFID circuit, and wherein the auto-reset fuse automatically resets after a predetermined period to re-enable the RFID circuit.

10. The device of claim 9, wherein the security circuit comprises a voltage multiplier circuit charged via radio signals to open the auto-reset fuse in response to the discharge of the voltage stored in the voltage multiplier circuit to the auto-reset fuse.

11. The device of claim 9, wherein the security circuit is resettable to re-enable the RFD circuit via an RFID writer.

12. The device of claim 9, wherein the security circuit comprises a capacitor which when charged disables the RFID circuit and when discharged enables the RFID circuit.

13. The device of claim 9, wherein the predetermined number equals one.

14. A device comprising:
a radio-frequency identification (RFID) circuit;
a security circuit including a fuse that is opened in response to a predetermined number of readings of the RFID circuit such that the security circuit disables the RFID circuit directly in response to a predetermined number of readings of the RFID circuit.

15. The device of claim 14, wherein the security circuit permanently disables the RFID circuit in response to the predetermined number of readings of the RFID circuit.

16. The device of claim 14, wherein the security circuit temporarily disables the RFID circuit for a predetermined period in response to the predetermined number of readings of the RFID circuit.

17. The device of claim 14, wherein:
the security circuit comprises a programmable bit to disable the RFID circuit in response to the predetermined number of readings of the RFID circuit, and
the programmable bit is resettable by an RFID writer.

18. The device of claim 14, wherein the predetermined number equals one.

\* \* \* \* \*